(12) United States Patent
Tsutsui et al.

(10) Patent No.: US 10,931,162 B2
(45) Date of Patent: Feb. 23, 2021

(54) DRIVE DEVICE (71) Applicant: DENSO CORPORATION, Kariya (JP)

(72) Inventors: Toshio Tsutsui, Kariya (JP); Yasufumi Matsuo, Kariya (JP); Koji Matsuo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/560,075

(22) Filed: Sep. 4, 2019

(65) Prior Publication Data

US 2019/0393753 A1 Dec. 26, 2019

Related U.S. Application Data (63) Continuation of application No. PCT/JP2018/007718, filed on Mar. 1, 2018.

(30) Foreign Application Priority Data

Mar. 6, 2017 (JP) .............................. JP2017-041488

(51) Int. Cl.
*H02K 5/00* (2006.01)
*H02K 5/22* (2006.01)
*H02K 11/30* (2016.01)
*B62D 5/04* (2006.01)
*H02K 9/18* (2006.01)

(52) U.S. Cl.
CPC ........... *H02K 5/225* (2013.01); *B62D 5/0403* (2013.01); *B62D 5/0463* (2013.01); *H02K 9/18* (2013.01); *H02K 11/30* (2016.01)

(58) Field of Classification Search
CPC .... B62D 5/0463; B62D 5/0403; H02K 5/225; H02K 5/04; H02K 15/028; H02K 15/14; H02K 5/00; H02K 2211/03; H02K 11/30; H02K 9/18
USPC .............................. 310/45, 71, 89, 400–433
See application file for complete search history.

(56) References Cited

U.S. PATENT DOCUMENTS

| | | | |
|---|---|---|---|
| 9,088,196 B2 * | 7/2015 | Nakano | H02K 11/33 |
| 9,270,145 B2 * | 2/2016 | Asao | H02K 11/30 |
| 9,735,643 B2 | 8/2017 | Yamasaki | |
| 9,831,738 B2 | 11/2017 | Yamasaki et al. | |
| 9,834,247 B2 | 12/2017 | Abe et al. | |
| 10,211,706 B2 * | 2/2019 | Hayashi | H02K 11/33 |
| 2013/0099609 A1 * | 4/2013 | Ikeno | H02K 11/33 |
| | | | 310/52 |

FOREIGN PATENT DOCUMENTS

| | | |
|---|---|---|
| JP | 2015089215 A | 5/2015 |
| JP | 5924547 B2 | 5/2016 |
| JP | 2017108501 A | 6/2017 |

* cited by examiner

*Primary Examiner* — Thanh Lam
(74) *Attorney, Agent, or Firm* — Maschoff Brennan

(57) ABSTRACT

A rear frame has a plurality of engaging portions engaged with connection members. An engagement surface of the specific engaging portion which is a part of the plurality of engaging portions is in a state in which the connection member is in contact with the connection member, and the material of the rear frame is exposed. Among the plurality of engaging portions, the other engaging portion other than the specific engaging portion and the outer wall portion of the rear frame exposed to the outside space have a coating.

14 Claims, 11 Drawing Sheets

DRIVE DEVICE

CROSS REFERENCE TO RELATED APPLICATIONS

The present application is a continuation application of International Patent Application No. PCT/JP2018/007718 filed on Mar. 1, 2018, which designated the U.S. and claims the benefits of priority of Japanese Patent Application No. 2017-041488 filed on Mar. 6, 2017. The entire disclosure of all of the above applications is incorporated herein by reference.

TECHNICAL FIELD

The present disclosure relates to a drive device, and is suitable, for example, for an electric power steering apparatus that assists a steering of a driver of a vehicle.

BACKGROUND

A drive device is integrally provided with a motor and a controller that controls the motor.

SUMMARY

The present disclosure is a drive device for use in an electric power steering apparatus for assisting the driver's steering of a vehicle. The drive device includes a stator, a rotor rotatable relative to the stator, a front frame provided on one side in the axial direction with respect to the stator, and a rear frame provided on other side in the axial direction with respect to the stator.

The stator or a member for fixing the stator is interposed between the front frame and the rear frame. Furthermore, the drive device includes a plurality of metal connection members connecting the front frame and the rear frame, a substrate located on the opposite side of the front frame, and an electronic component mounted on the substrate and configured to control energization of a coil of the stator.

The rear frame has a plurality of engaging portions engaged with the connection members. The engagement surface of the specific engaging portion which is a part of the plurality of engaging portions is in a state in which the connection member is in contact with the connection member, and the material of the rear frame is exposed.

Among the plurality of engaging portions, the other engaging portion other than the specific engaging portion and the outer wall portion of the rear frame exposed to the outside space have a coating.

DETAILED DESCRIPTION

A first embodiment will be described below based on the drawings. The same reference numerals are given to the same configurations as those in the embodiments, and a description thereof will not be omitted.

FIRST EMBODIMENT

Figure 1:
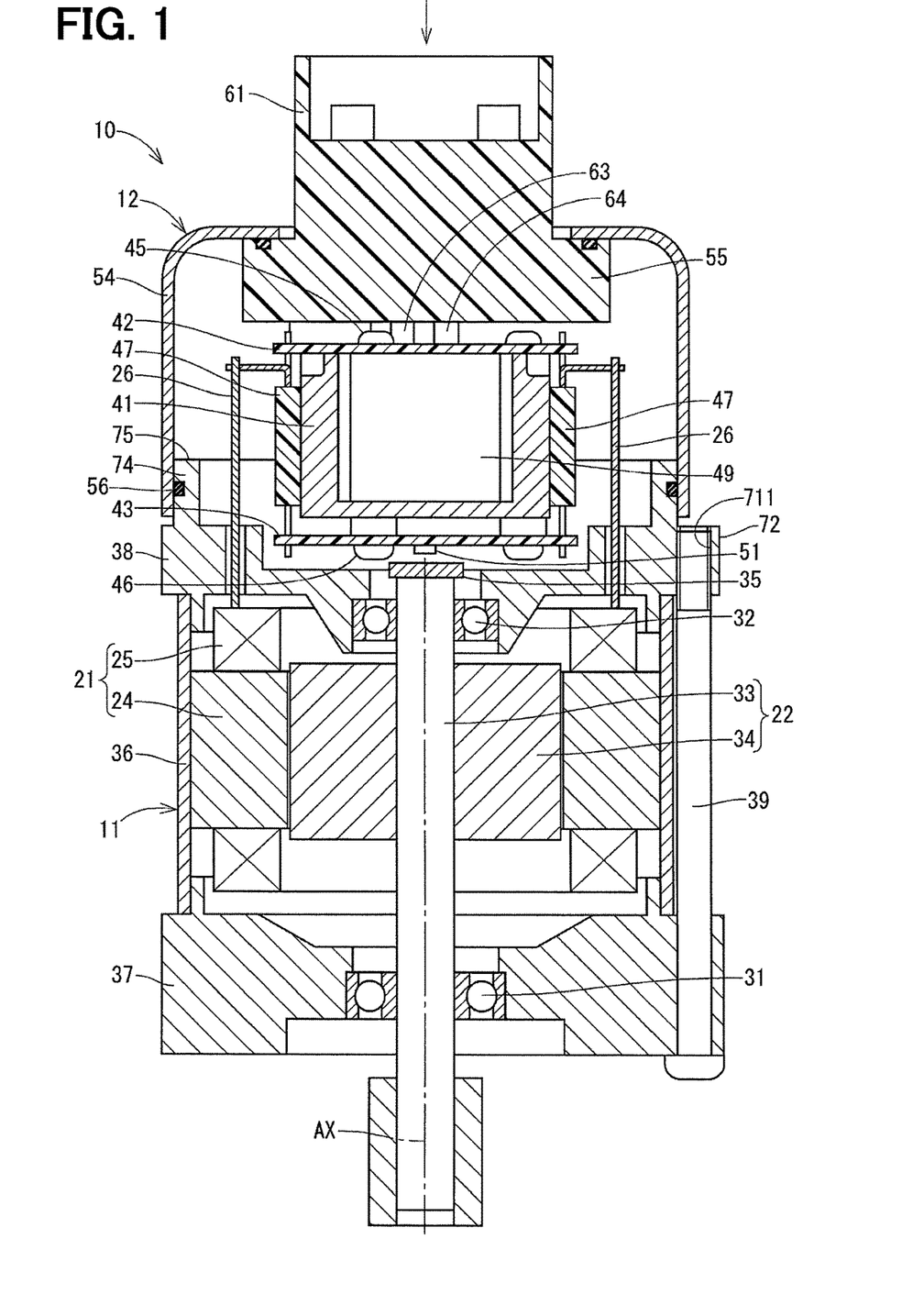
FIG. 1 is a longitudinal sectional view of a drive device according to a first embodiment.
Figure 2:
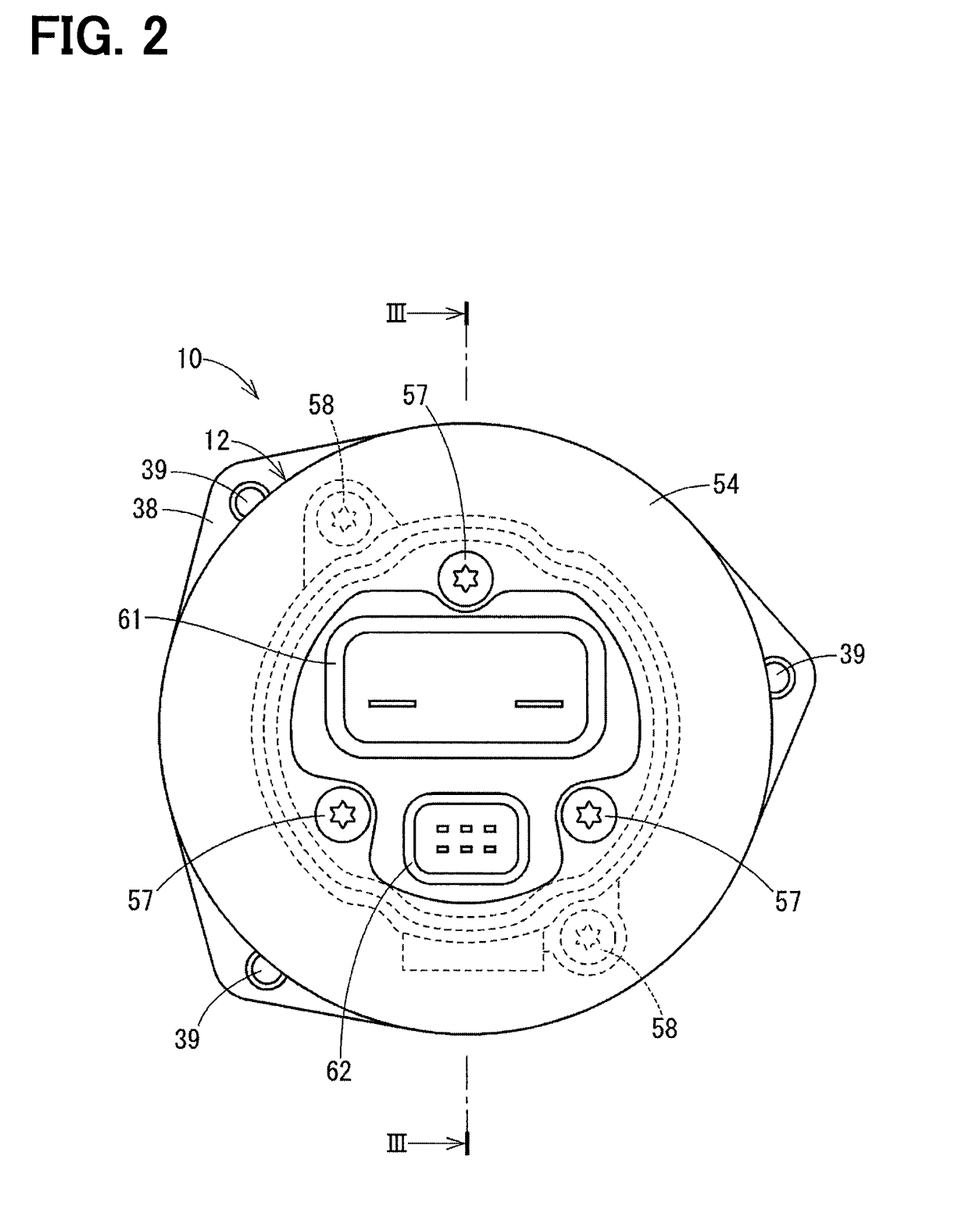
FIG. 2 is a view of the drive device of FIG. 1 as viewed in a direction of an arrow II.

A drive device according to a first embodiment is shown in FIG. 1. The drive device 10 is used as a drive source of an electric power steering device that assists the driver's steering of the vehicle.

First, the overall configuration of the drive device 10 will be described with reference to FIGS. 1 to 4.

The drive device 10 is a mechanical-electrical integrated drive device in which a motor 11 and a control unit 12 for controlling the motor 11 are integrally provided.

The motor 11 is a three-phase brushless motor, and includes a stator 21, a rotor 22, and a housing 23 for housing them.

The stator 21 has a stator core 24 fixed in the housing 23 and two sets of three-phase coils (hereinafter, coil) 25 assembled to the stator core 24. One lead wire 26 extends from each phase winding forming the coil 25.

The rotor 22 has a rotating shaft 33 supported by bearings 31 and 32 and a rotor core 34 fitted to the rotating shaft 33. The rotor 22 is provided radially inside the stator 21, and is rotatable relative to the stator 21. A detection member 35 made of a permanent magnet is provided at one end of the rotating shaft 33. The detection member 35 is used to detect the rotation angle of the rotor 22 by a rotation angle sensor 51, which will be described later.

The housing 23 has a case 36, a front frame 37, a rear frame 38 and a through bolt 39. The case 36 is a cylindrical member to which the stator 21 is fixed. The front frame 37 is provided on one side in an axial direction with respect to the stator 21. The rear frame 38 holds the case 36 between the rear frame 38 and the front frame 37 on the other side in the axial direction with respect to the stator 21. The through bolt 39 is a metal connection member connecting the front frame 37 and the rear frame 38. In the present embodiment, the through bolts 39 are provided at three locations separated from each other in the circumferential direction.

The control unit 12 includes a heat sink 41, a first substrate 42, a second substrate 43, screws 44, 45 and 46, electronic components 47 to 53, a cover 54, and a connector unit 55.

The heat sink 41 is fixed on the opposite side of the front frame 37 to the rear frame 38 by a screw 44. The first substrate 42 is fixed on the opposite side of the rear frame 38 to the heat sink 41 by a screw 45. The second substrate 43 is fixed to the rear frame 38 side of the heat sink 41 by a screw 46.

The electronic components 47 to 53 are connected to the first substrate 42 or the second substrate 43, and control the energization of the coil 25 of the stator 21. The power module is fixed to the heat sink 41, and has a plurality of switching elements (not shown) that constitute an inverter, and is connected to the lead wire 26.

On the first substrate 42, a capacitor 48 that assists the power supply to the coil 25 by storing electric charge, and a coil 49 that constitutes a filter circuit together with the capacitor 48, and the like are mounted.

On the second substrate 43, rotation angle sensor 51, an integrated circuit 52 that outputs a drive signal to a switching element, and a microcomputer 53 that calculates command values for power supplied to each phase winding of the coil 25, and the like are mounted.

The cover 54 is cup-shaped and is fitted to the outside of the rear frame 38. An O-ring 56 seals between the cover 54 and the rear frame 38.

The connector unit 55 is provided so as to close the through hole at the bottom of the cover 54, and is fixed to the cover 54 by the screw 57 and to the heat sink 41 by the screw 58. Also, the connector unit 55 has a power supply connector 61 and a signal connector 62 which protrude out of the cover 54. A power supply terminal 63 and a ground terminal 64, which are power supply terminals, are connected to the first substrate 42. The signal terminal 65 is connected to the second substrate 43.

The drive device 10 configured as described above sequentially switches energization of each phase winding of the coil 25 based on a detection signal of the rotation angle sensor 51 so as to generate a rotating magnetic field, and thereby rotates the rotor 22. The control unit 12 is mounted on one side in the axial direction with respect to the motor 11. Therefore, it is possible to prevent the control unit 12 from directly receiving the vibration of the motor 11.

Next, the characteristic configuration of the drive device 10 will be described with reference to FIGS. 1 to 10.

Figure 5:
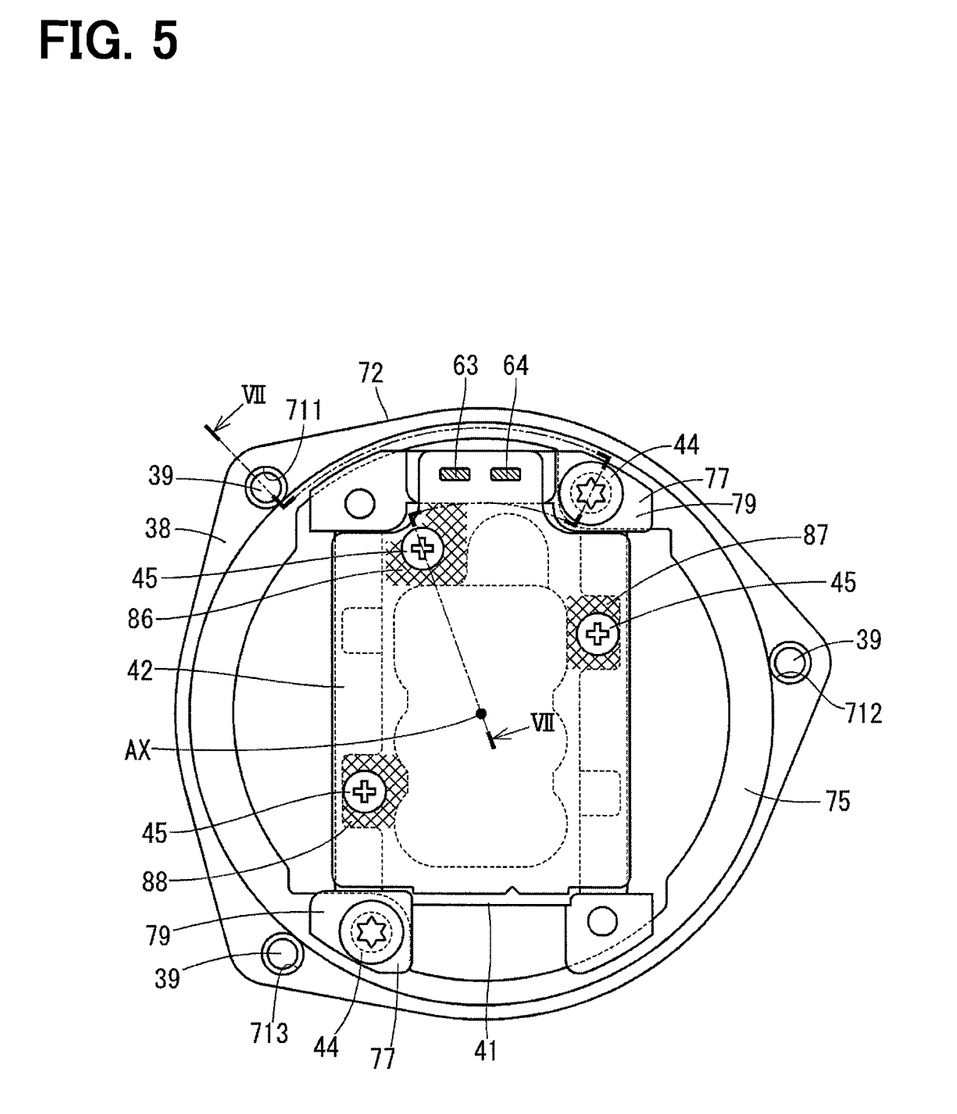
FIG. 5 is a view showing a state in which a connector unit is removed from the state shown in FIG. 4.

In the following description, the direction parallel to the rotation shaft center AX of the motor 11 is defined as the axial direction, the direction orthogonal to the rotation shaft center AX is defined as the radial direction (i.e, the motor radial direction), and the direction about the rotation shaft center AX is defined as the circumferential direction. In FIG. 5, the electronic components mounted on the first substrate 42 are not shown.

(First Threaded Hole)

Figure 4:
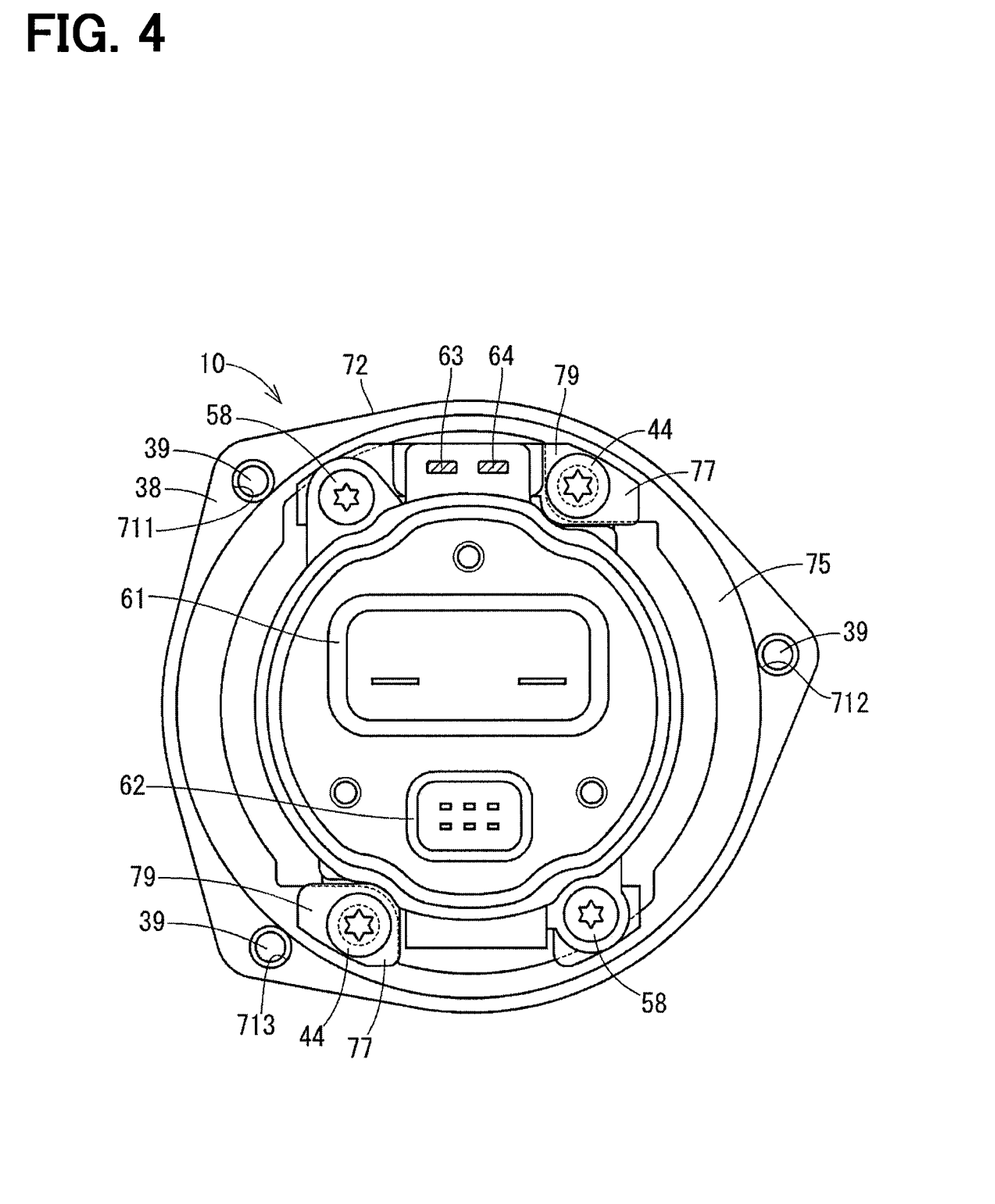
FIG. 4 is a view showing a state in which the cover of the drive device of FIG. 2 is removed.
Figure 7:
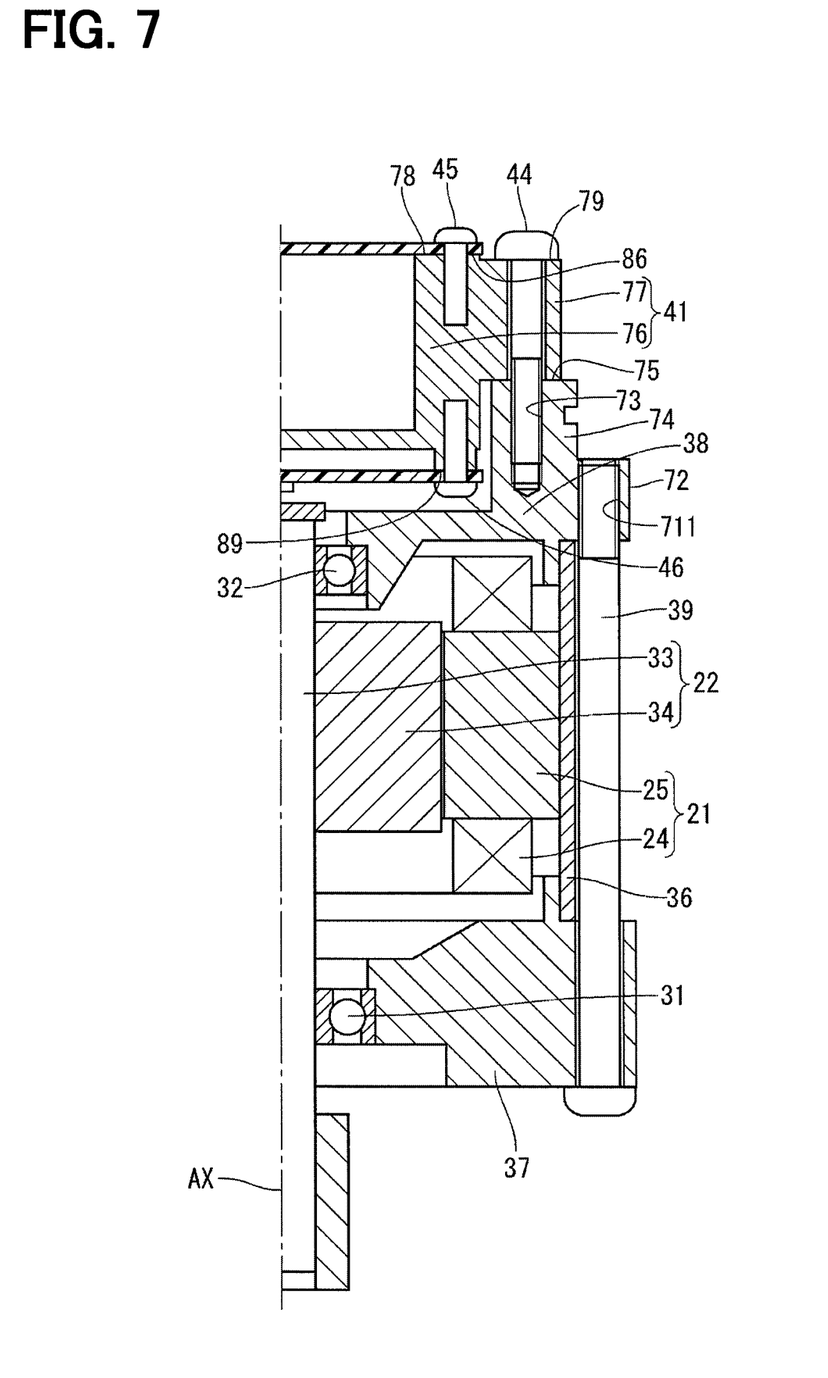
FIG. 7 is a sectional view taken along line VII-VII of the drive device of FIG. 5.

As shown in FIG. 1, FIG. 4, FIG. 7, etc., the rear frame 38 has a plurality of first threaded holes 711 to 713 to which the threaded portion of the through bolts 39 are screwed. The first threaded holes 711 to 713 are engaging portions engaged with the through bolts 39.

The surface of a specific first threaded hole 711 which is a part of the plurality of first threaded holes 711 to 713 is in contact with the through bolt 39, and is in a state in which the material of the rear frame 38 is exposed. The surface of the first threaded hole 711 is a surface on which a screw is formed, and is an engagement surface engaged with the through bolt 39. In the present embodiment, the rear frame 38 is made of an aluminum alloy, and "state in which the material of the rear frame 38 is exposed" indicates that the metal surface of the aluminum alloy is exposed.

The other first threaded holes 712 and 713 other than the specific first threaded hole 711 among the plurality of first threaded holes 711 to 713, and the outer wall portion 72 of the rear frame 38 exposed to the external space have a coating. In the present embodiment, the film is an oxide film formed by a hard alumite treatment. "Having a coating" means that the metal surface of the aluminum alloy that is the material of the rear frame 38 is covered with the coating film and the metal surface is not exposed.

Number of the specific first threaded hole 711 is one, and number of the other first threaded holes 712 and 713 are two. The rear frame 38 is formed by applying a coating process in a state in which only the first threaded holes 711 is masked after forming the first threaded holes 711 to 713.

(Second Threaded Hole)

As shown in FIG. 7, the rear frame 38 has a second threaded hole 73 in which the threaded portion of the screw 44 is screwed. The surface of the second threaded hole 73 is in contact with the screw 44 and is in a state in which the material of the rear frame 38 is exposed. The surface of the second threaded hole 73 is a surface on which a screw is formed, and is an engagement surface engaged with the screw 44.

The rear frame 38 has a cylindrical end 74 protruding toward the heat sink 41 in the axial direction. One end on the opening side of the second threaded hole 73 is flush with the end face of the rear frame 38 on the heat sink 41 side, that is, the end surface 75 of the cylindrical end 74.

(Heatsink)

Figure 6:
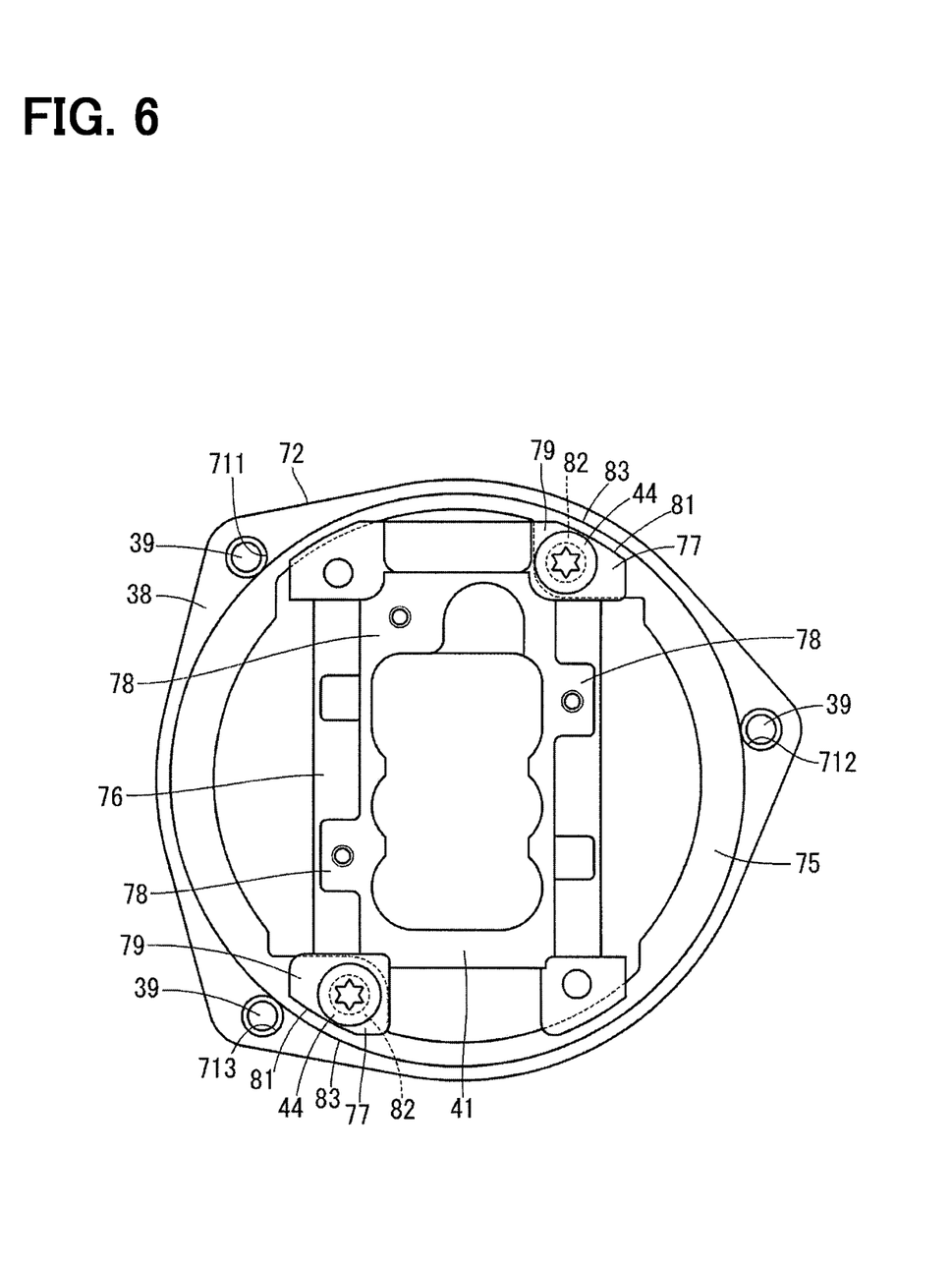
FIG. 6 is a view showing a state in which a first substrate is removed from the state shown in FIG. 5.

As shown in FIGS. 5 to 7, the heat sink 41 includes a main body portion 76 to which the substrates 42 and 43 are fixed, and a fixing portion 77 which protrudes from the main body portion 76, and which is fixed to the rear frame 38 by the screw 44 so as to be in contact with the end surface 75 of the cylindrical end 74 in an axial direction. In the present embodiment, two fixing portions 77 are provided so as to protrude from the main body portion 76 on one direction side and the other direction side in the radial direction.

As shown in FIG. 7, the fixing portion 77 is formed to extend from a central portion in the axial direction of the main body portion 76 to an end part on the opposite side to the rear frame 38 of the main body portion 76. The thickness of the fixing portion 77 in the axial direction is set to be approximately half the thickness in the axial direction of the main body portion 76.

The first substrate 42 is provided on the side opposite to the rear frame 38 with respect to the main body portion 76. The main body portion 76 has a first substrate mounting surface 78 in contact with the first substrate 42 on the side opposite to the rear frame 38. A seat surface 79 of the fixing portion 77 in contact with the screw 44 is substantially flush with the first substrate mounting surface 78. The term "substantially the same plane" is a concept that includes a difference in the degree to which a slight step is provided in order to avoid interference with the first substrate 42 in manufacturing. The slight step is, for example, a step which is equal to or less than the thickness of the first substrate 42.

As shown in FIG. 6, the radius of curvature of an outer edge 81 of the seat surface 79 of the fixing portion 77 is larger than the radius of curvature of the head seat surface 82 of the screw 44, and is smaller than the curvature of the outer edge 83 of the end surface 75 of the cylindrical end 74. That is, the fixing portion 77 is enlarged so that the seat surface 79 radially and circumferentially expands more than the contact area required for tightening the screw 44.

Figure 8:
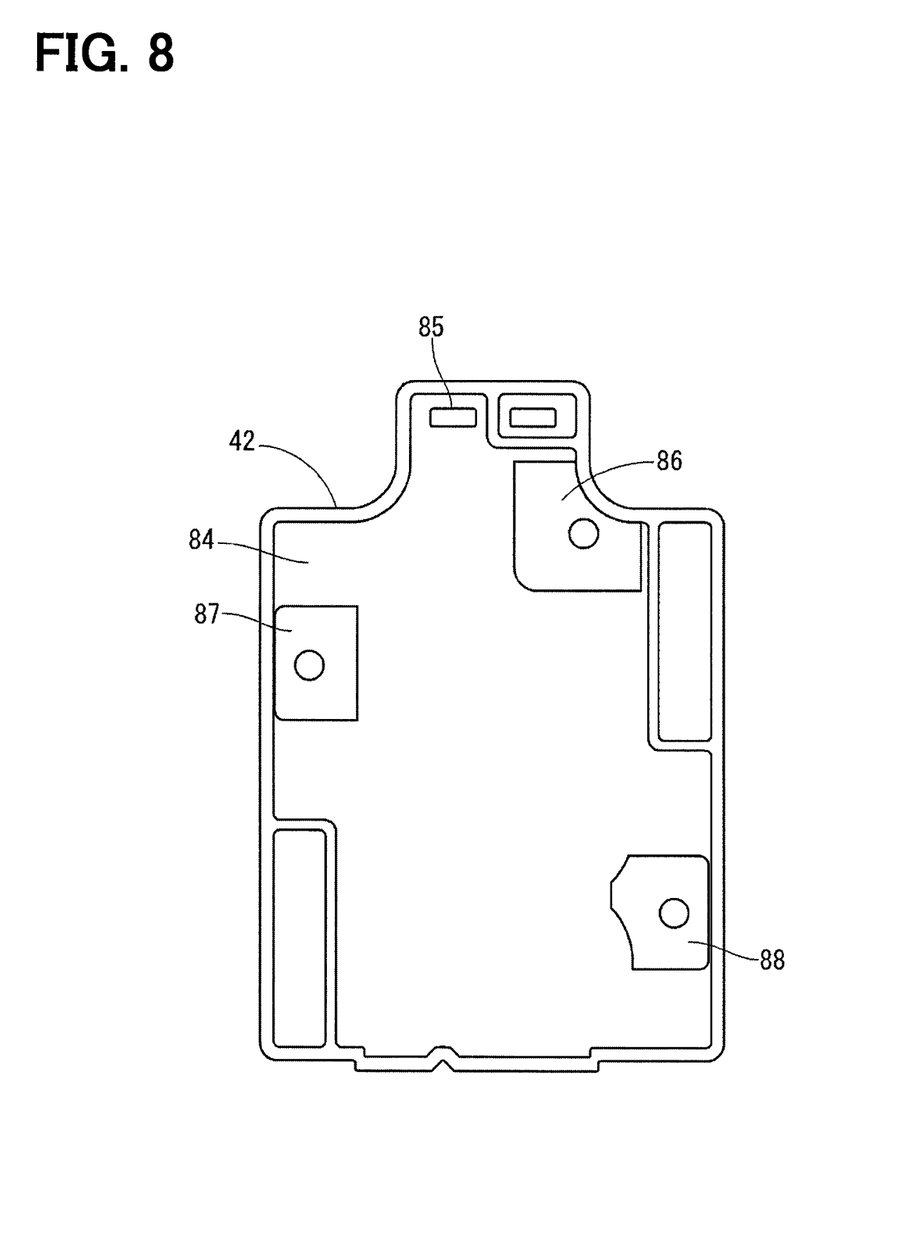
FIG. 8 is a view of the first substrate of FIG. 5 as viewed from the heat sink side.

As shown in FIGS. 5 and 8, the ground pattern 84 positioned on the main body portion 76 side of the first substrate 42 has a ground connection portion 85 to which the ground terminal 64 is connected, and a plurality of resist removal portions 86, 87, 88 which are in contact with the first substrate mounting surface 78 without being provided with a resist (i.e, an insulating film). Among the plurality of resist removal portions 86, 87, 88, the specific resist removal portion 86 located closest to the ground connection portion 85 at a linear distance has an area larger than that of the other resist removal portions 87 and 88. The shaded portion of the first substrate mounting surface 78 in FIG. 5 indicates the resist removal portions 86, 87, 88 on the back side of the first substrate mounting surface 78. The shaded area corresponds to the size of the plurality of resist removal portions 86, 87, 88 which are in contact with the first substrate mounting surface 78.

Figure 3:
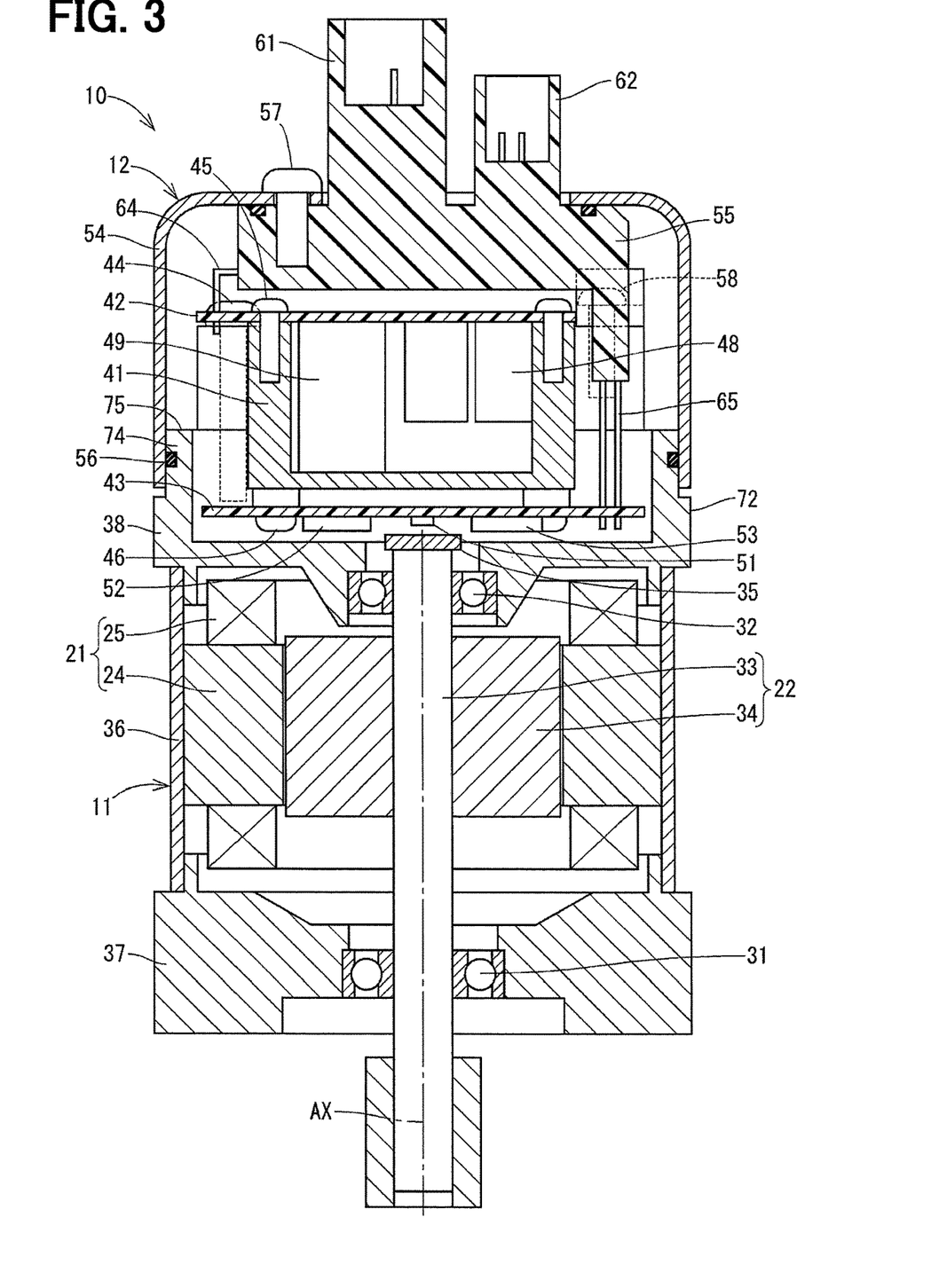
FIG. 3 is a sectional view taken along line III-III of the drive device of FIG. 2.

As shown in FIG. 3, the ground terminal 64 is not connected to the second substrate 43. The noise generated in the second substrate 43 or the noise transmitted to the second substrate 43 is transmitted to the ground terminal 64 through the heat sink 41 and the first substrate 42.

Figure 9:
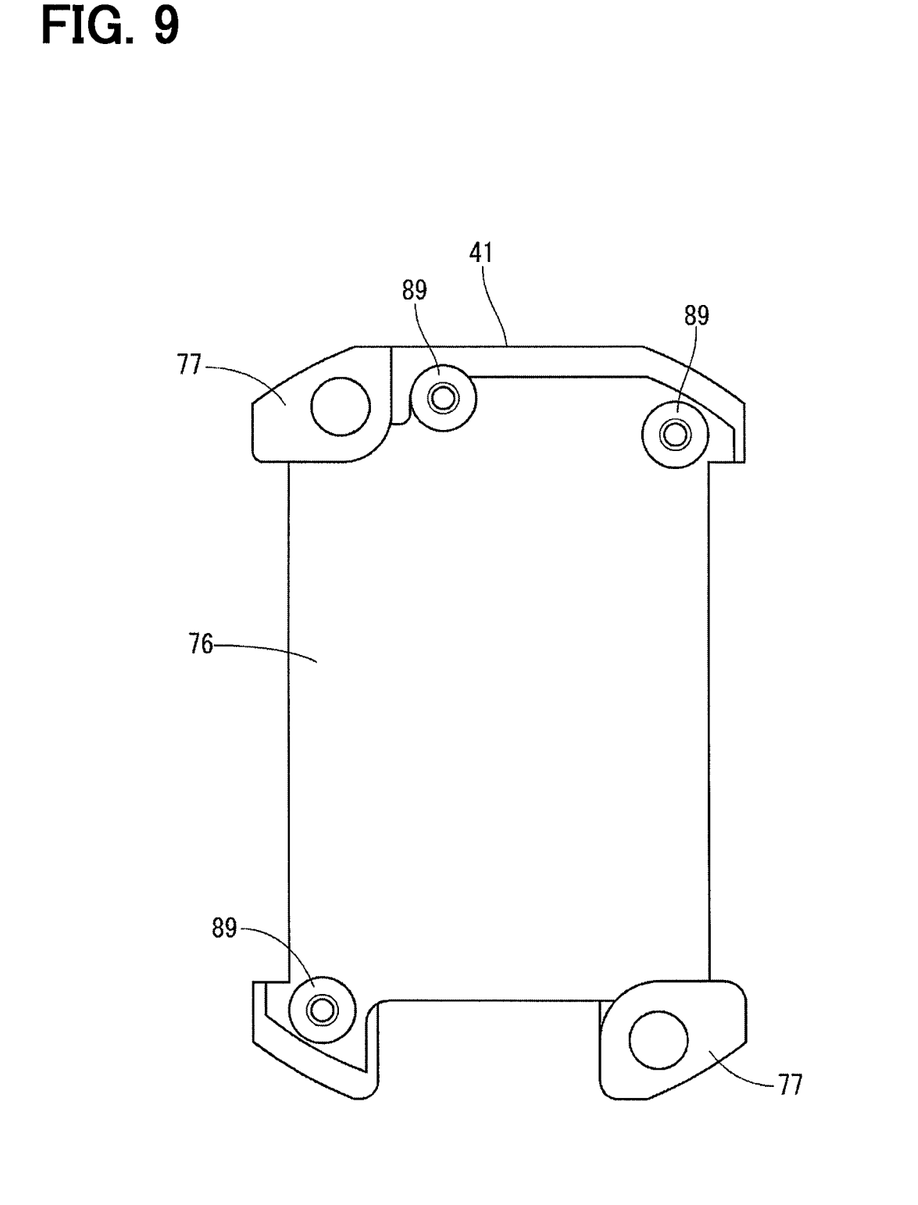
FIG. 9 is a view of a heat sink of FIG. 5 as viewed from the rear frame side.

As shown in FIGS. 7 and 9, the main body portion 76 has a plurality of second substrate mounting surfaces 89 which are in contact with the second substrate 43 on the rear frame 38 side. The second substrate 43 has, at a portion corresponding to the second substrate mounting surface 89, a resist removal portion which are in contact with the second substrate mounting surface 89 without being provided with a resist. As shown in FIG. 9, the second substrate mounting surface 89 on the side of the ground connection portion 85 of the main body portion 76 (the upper side of the drawing of FIG. 9) is provided more than the second substrate mounting surface on the side opposite to the ground connection portion 85 (the lower side of the drawing of FIG. 9). Since the size of each second substrate mounting surface 89 is the same, the contact area of the main body portion 76 with the second substrate 43 is larger on the ground connection portion 85 side than on the opposite side to the ground connection portion 85.

Figure 10:
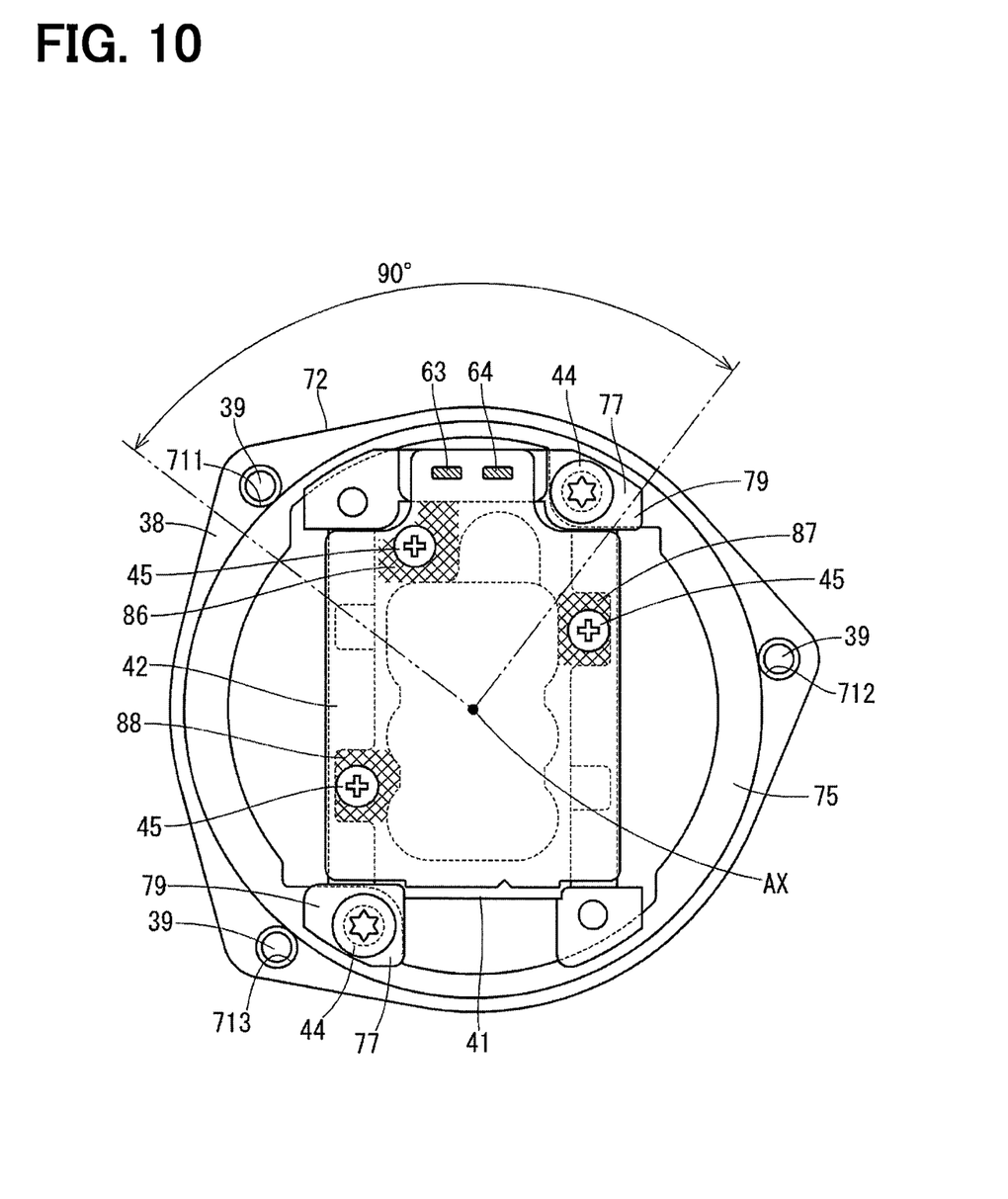
FIG. 10 is a view showing the same state as FIG. 5 and a view explaining a range in which a through bolt, a screw and a specific resist removal surface are located.

As shown in FIG. 10, the through bolt 39, the screw 44, and the specific resist removal portion 86 are all accommodated within a central angle range of 90° centered on the rotation axis AX of the rotor 22 when viewed in the axial direction. That is, the feedback path of the noise from the front frame 37 to the first substrate 42 via the through bolt 39, the rear frame 38, the screw 44 and the heat sink 41 is all within the central angle range.

(Effects)

As described above, in the first embodiment, the rear frame 38 has the plurality of first threaded holes 711 to 713 engaged with the through bolt 39. The engagement surface of the specific first threaded hole 711 which is a part of the plurality of first threaded holes 711 to 713 is in contact with the through bolt 39, and is a state in which the material of the rear frame 38 is exposed.

The other first threaded holes 712 and 713 other than the specific first threaded hole 711 among the plurality of first threaded holes 711 to 713, and the outer wall portion 72 of the rear frame 38 exposed to the external space have a coating.

Since the outer wall portion 72 of the rear frame 38 has a coating, the corrosion resistance of the drive device 10 can be improved.

In addition, since the specific first threaded hole 711 is a state in which the material of the rear frame 38 is exposed without providing the coating, the conductive state between the rear frame 38 and the through bolt 39 is improved. As a result, the impedance between the front frame 37 and the rear frame 38 is reduced. Therefore, a feedback path is formed to feed back the noise transmitted to the front frame 37 to the control unit 12 side via the through bolt 39 and the rear frame 38.

Therefore, it is possible to obtain a drive device 10 which can achieve both improvements in the corrosion resistance and the suppression of the radiation noise.

In the first embodiment, the rear frame 38 has a plurality of second threaded holes 73 in which the threaded portion of the screw 44 is threadedly engaged. The surface of the second threaded hole 73 is in contact with the screw 44 and is in a state in which the material of the rear frame 38 is exposed.

In addition, since the second threaded hole 73 is a state in which the material of the rear frame 38 is exposed without providing the coating, the conductive state between the rear frame 38 and the screw 44 is improved. As a result, the impedance between the rear frame 38 and the heat sink 41 is reduced. Therefore, the feedback path is formed to be fed back from the rear frame 38 to the control unit 12 through the heat sink 41.

In the first embodiment, one end on the opening side of the second threaded hole 73 is flush with the end surface 75 on the heat sink 41 side of the rear frame 38.

As a result, the second threaded hole 73 that form the feedback path of the noise can be brought close to the first substrate 42 as much as possible. Therefore, a relatively short feedback path can be formed. Further, the rear frame 38 is easily formed by eliminating the step on the end surface 75 of the rear frame 38.

In the first embodiment, the heat sink 41 includes a main body portion 76 to which the substrates 42 and 43 are fixed, and a fixing portion 77 which protrudes from the main body portion 76, and which is fixed to the rear frame 38 by the screw 44 so as to be in contact with the end surface 75 of the cylindrical end 74 in an axial direction. The fixing portion 77 is formed to have a thickness so as to extend from a central portion in the axial direction of the main body portion 76 to an end part on the opposite side to the rear frame 38 of the main body portion 76.

As a result, the fixing portion 77 forming the feedback path of noise can be brought closer to the first substrate 42 as much as possible, and the feedback path can be formed with low impedance. Moreover, the heat dissipation properties of the heat sink 41 can be improved, and the fixing strength can be enhanced. These effects can be obtained by effectively utilizing the space in the cover 54.

In the first embodiment, the first substrate 42 is provided on the side opposite to the rear frame 38 with respect to the main body portion 76. The main body portion 76 has a first substrate mounting surface 78 in contact with the first substrate 42 on the side opposite to the rear frame 38. A seat surface 79 of the fixing portion 77 in contact with the screw 44 is substantially flush with the first substrate mounting surface 78.

As a result, the fixing portion 77 forming the feedback path of noise can be brought closer to the first substrate 42 as much as possible, and the impedance of the feedback path can be lowered.

Further, in the first embodiment, the rear frame 38 has a cylindrical end 74 protruding toward the heat sink 41 in the axial direction. The end surface 75 of the cylindrical end 74 is an end surface on the heat sink 41 side of the rear frame 38. The radius of curvature of an outer edge 81 of the seat surface 79 of the fixing portion 77 is larger than the radius of curvature of the head seat surface 82 of the screw 44, and is smaller than the curvature of the outer edge 83 of the end surface 75 of the cylindrical end 74.

Thereby, the fixing portion 77 can be enlarged so that the seat surface 79 expands in the radial and circumferential directions more than the contact area required for tightening the screw 44. Therefore, the impedance of the feedback path of the noise can be reduced. Moreover, the heat dissipation properties of the heat sink 41 can be improved, and the fixing strength can be enhanced.

In the first embodiment, the ground pattern 84 positioned on the main body portion 76 side of the first substrate 42 has a ground connection portion 85 to which the ground terminal 64 is connected, and a plurality of resist removal portions 86, 87, 88 which are in contact with the first substrate mounting surface 78 without being provided with a resist. Among the plurality of resist removal portions 86, 87, 88, the specific resist removal portion 86 located closest to the ground connection portion 85 at a linear distance has an area larger than that of the other resist removal portions 87 and 88.

Thereby, the contact area between the main body portion 76 and the ground pattern 84 can be secured, and the impedance of the noise feedback path can be lowered. Further, the heat dissipation performance from the first substrate 42 to the heat sink 41 is also improved.

In the first embodiment, the main body portion 76 has a plurality of second substrate mounting surfaces 89 which are in contact with the second substrate 43 on the rear frame 38 side. A larger number of second substrate mounting surfaces 89 are provided on the ground connection portion 85 side of the main body portion 76 than on the side opposite to the ground connection portion 85.

Thus, the conduction path from the ground terminal 64 to the second substrate 43 via the first substrate 42 and the heat sink 41 can be shortened, and the conduction path can be fastened with low impedance. Therefore, noise is reduced.

In the first embodiment, the through bolt 39, the screw 44, and the specific resist removal portion 86 are all accommodated within a central angle range of 90° centered on the rotation axis AX of the rotor 22 when viewed in the axial direction.

As a result, the noise feedback path from the front frame 37 to the first substrate 42 via the through bolt 39, the rear frame 38, the screw 44 and the heat sink 41 can be formed as short as possible.

SECOND EMBODIMENT

Figure 11:
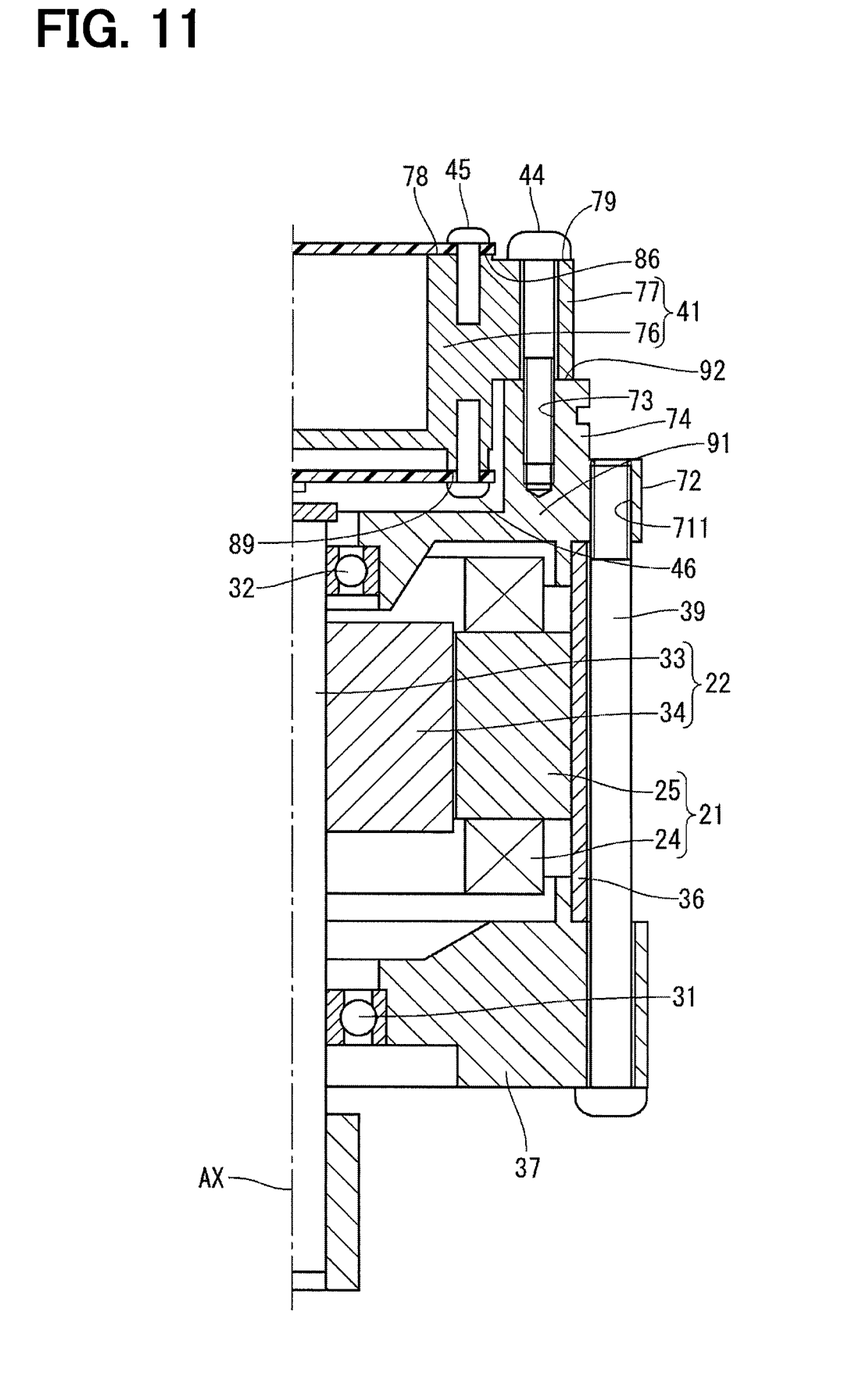
FIG. 11 is a partial longitudinal sectional view of a drive device according to a second embodiment.

In the second embodiment, as shown in FIG. 11, a mounting surface 92 of the rear frame 91 on which the heat sink 41 is mounted is in a state in which the metal surface of the aluminum alloy, which is the material of the rear frame 91, is exposed.

As a result, the conduction state between the rear frame 91 and the heat sink 41 is improved, so that the impedance between the rear frame 91 and the heat sink 41 is reduced. Therefore, the feedback path is formed to be fed back from the rear frame 91 to the control unit 12 through the heat sink 41.

The mounting surface 92 is an end face of the rear frame 91 on the heat sink 41 side.

Thus, the rear frame 91 forming the feedback path of noise can be brought close to the first substrate 42 as much as possible. Therefore, a relatively short feedback path can be formed. Further, the rear frame 91 is easily formed by eliminating the step on the end face of the rear frame 91.

OTHER EMBODIMENTS

In other embodiments, the coating of the rear frame is not limited to that by alumite treatment. The material of the rear frame may be a metal other than an aluminum alloy.

In other embodiments, the two frames may be connected by a connecting member other than a through bolt.

In other embodiments, the conductive grease or adhesive is filled between a specific first threaded hole in the rear frame and the threaded portion of the through bolt, and thereby the corrosion resistance of the particular first threaded hole may be improved while improving conductivity.

In other embodiment, the housing of the motor is not provided with a case, and may be composed of two frames, and the stator core may be interposed between two frames.

In other embodiment, the three-phase coils of the motor may be one set or three or more sets. Further, the number of phases of the motor may be other than three. Also, the motor may be a type of motor other than a three-phase brushless motor.

The present disclosure is not limited to the embodiments described above, and various modifications are possible within the scope of the present disclosure without departing from the spirit of the invention.

The person related to the present disclosure considers that a coating process is applied to the frame of the motor in order to improve the corrosion resistance of the drive device in the assumable example. However, it is found that a radiation noise generated due to the operation of the driving device is increased, when coating processing is applied to the frame of the motor.

So, the present disclosure provides a driving device capable of achieving both improvements in corrosion resistance and suppression of radiation noise The noise generated by the controller is transmitted to the front frame through the inside of the motor and the like. When the noise is transmitted to the rack gear case and the vehicle body ahead of the rack gear case, the noise is radiated from respective parts so as to become radiation noise.

In addition, in the case where the noise is transmitted to the controller of the drive unit after being transmitted to the rack gear case and the vehicle body ahead of the rack gear case, and then is returned to the controller, a feedback path becomes a relatively large loop. This loop may be an antenna to generate a high level radiation noise.

The present disclosure person considered that applying the coating treatment to the motor frame of the driving device for improving the corrosion resistance may lead to the generation of the above-mentioned radiation noise. That is, it was considered that the feedback path for returning the noise transmitted to the front frame to the ground terminal of the controller without being transmitted to the rack gear case or the like would be lost by the coating process. The present disclosure person has completed the present disclosure based on this finding.

The present disclosure is a drive device for use in an electric power steering apparatus for assisting the driver's steering of a vehicle. The drive device includes a stator, a rotor rotatable relative to the stator, a front frame provided on one side in the axial direction with respect to the stator, and a rear frame provided on other side in the axial direction with respect to the stator.

The stator or a member for fixing the stator is interposed between the front frame and the rear frame. Furthermore, the drive device includes a plurality of metal connection members connecting the front frame and the rear frame, a heat sink fixed to the rear frame on the opposite side of the front frame, a substrate mounted to the heat sink, and an electronic component mounted on the substrate and configured to control energization of a coil of the stator.

The rear frame has a plurality of engaging portions engaged with the connection members. The engagement surface of the specific engaging portion which is a part of the plurality of engaging portions is in a state in which the connection member is in contact with the connection member, and the material of the rear frame is exposed. Among the plurality of engaging portions, the other engaging portions other than the specific engaging portion, and the outer wall portion of the rear frame exposed to the outside space have a coating.

Since the outer wall portion of the rear frame has a coating, the corrosion resistance of the drive device can be improved.

Further, in the specific engaging portion the material of the rear frame is exposed without providing a coating. The conduction state between the rear frame and the connection member is improved. As a result, the impedance between the front frame and the rear frame is reduced. Therefore, a feedback path is formed to return the noise transmitted to the front frame to the control unit side through the specific engaging portion of the connection member and the rear frame.

Therefore, it is possible to obtain a drive device which can achieve both improvements in the corrosion resistance and the suppression of the radiation noise.

The invention claimed is:

1. A drive device for use in an electric power steering apparatus that assists a steering of a driver in a vehicle, comprising:
   a stator;
   a rotor configured to be rotatable relative to the stator;
   a front frame provided on one side in an axial direction with respect to the stator;
   a rear frame provided on the other side in the axial direction with respect to the stator, and configured to hold the stator or a member fixing the stator between itself and the front frame;
   a plurality of metallic connection members configured to connect the front frame and the rear frame;
   a substrate located to a side opposite to the front frame of the rear frame; and
   an electronic component mounted on the substrate and configured to control energization of coils of the stator, wherein
   the rear frame has a plurality of engaging portions engaged with the plurality of metallic connection members,
   an engagement surface of a specific engaging portion which is a part of the plurality of engaging portions is in contact with a respective connection member, and is in a state in which material of the rear frame is exposed, and
   an other engaging portion other than the specific engaging portion among the plurality of engaging portions, and an outer wall portion of the rear frame exposed to an outside space have a coating.

2. The drive device according to claim 1, further comprising
   a heat sink fixed to the side opposite to the front frame of the rear frame, wherein
   the substrate is fixed to the heat sink.

3. The drive device according to claim 2, wherein
   the respective connection member is composed of a through bolt, and
   the specific engaging portion is formed of a threaded hole in which a threaded portion of the through bolt is screwed.

4. The drive device according to claim 3, wherein
   in the case where the threaded hole is referred to as a first threaded hole,
   further comprising,
   a screw configured to fix the heat sink to the rear frame, wherein
   the rear frame has a second threaded hole in which a threaded portion of the screw is screwed, and
   a surface of the second threaded hole is in contact with the screw and is in a state in which material of the rear frame is exposed.

5. The drive device according to claim 4, wherein
   one end of opening sides of the second threaded hole is flush with an end surface on a heat sink side of the rear frame.

6. The drive device according to claim 3, wherein
   a mounting surface of the rear frame on which the heat sink is mounted is in a state in which material of the rear frame is exposed.

7. The drive device according to claim 6, wherein
   the mounting surface is an end surface on a heat sink side of the rear frame.

8. The drive device according to claim 3, further comprising
   a screw configured to fix the heat sink to the rear frame, wherein
   the heat sink includes a main body portion to which the substrate is fixed, and a fixing portion protruding from the main body portion in a radial direction of the rotor and fixed to the rear frame by the screw in a state where the heat sink is in contact with an end face on a heat sink side of the rear frame in the axial direction, and
   the fixing portion is formed so as to extend from a central part in the axial direction of the main body portion to an end part on a side opposite to the rear frame of the main body portion.

9. The drive device according to claim 8, wherein
   at least one substrate is provided on the side opposite to the rear frame of the main body,
   the main body portion has a substrate mounting surface in contact with the substrate on the side opposite to the rear frame, and
   a seat surface of the fixing portion in contact with the screw is substantially flush with the substrate mounting surface.

10. The drive device according to claim 9, wherein
    the rear frame has a cylindrical end portion protruding in the axial direction toward the heat sink,
    the end face of the cylindrical end portion is an end face on the heat sink side of the rear frame, and
    a radius of curvature of an outer edge of the seat surface of the fixing portion is larger than that of a head seat surface of the screw, and is smaller than that of the outer edge of the end face of the cylindrical end portion.

11. The drive device according to claim 9, wherein
    a ground pattern located on the main body portion side of the substrate has a ground connection portion to which a ground terminal is connected, and a plurality of resist removal portions which are in contact with the substrate mounting surface without being provided with a resist, and
    a specific resist removal portion located closest to the ground connection portion at a straight line distance among the plurality of resist removal portions has an area larger than that of the other resist removal portions.

12. The drive device according to claim 11, wherein,
    in the case where the substrate mounting surface is referred to as a first substrate mounting surface, the substrate includes a first substrate provided on a side opposite to the rear frame with respect to the main body portion, and a second substrate provided on the rear frame side with respect to the main body portion, the main body portion has a plurality of second substrate mounting surfaces which are in contact with the second substrate on the rear frame side, and a larger number of the second substrate mounting surfaces are provided on the side of the ground connection portion of the main body portion than on the side opposite to the ground connection portion.

13. The drive device according to claim 11, wherein the through bolt, the screw, and the specific resist removal portion all fall within a central angle range of 90° around a rotation axis of the rotor when viewed in the axial direction.

14. The drive device according to claim 8, wherein a ground pattern located on the main body portion side of the substrate has a ground connection portion to which a ground terminal is connected, and a plurality of resist removal portions which are in contact with the main body portion without being provided with a resist, in the plurality of resist removal portions, a specific resist removal portion located closest to the ground connection portion by a straight line distance is larger in area than the other resist removal portion, and the through bolt, the screw, and the specific resist removal portion all fall within a central angle range of 90° around a rotation axis of the rotor when viewed in the axial direction.

* * * * *